United States Patent [19]

Hermele

[11] Patent Number: 4,904,709

[45] Date of Patent: Feb. 27, 1990

[54] TEXTURED EXTERIOR SURFACE TREATMENT

[75] Inventor: Jules J. Hermele, Farmingville, N.Y.

[73] Assignee: Polymer Plastics Corp., Hauppauge, N.Y.

[21] Appl. No.: 250,779

[22] Filed: Sep. 28, 1988

[51] Int. Cl.$^4$ ................................................ C08K 7/22
[52] U.S. Cl. ..................................... 523/220; 523/223; 106/111; 106/109
[58] Field of Search ................ 523/220, 223; 106/111, 106/109

[56] References Cited

U.S. PATENT DOCUMENTS 4,391,647  7/1983  Deer et al. ........................... 106/115
4,632,876  12/1986  Laird et al. ........................... 428/404

Primary Examiner—Joseph L. Schofer
Assistant Examiner—John J. Guarriello
Attorney, Agent, or Firm—Darby & Darby

[57] ABSTRACT

A lightweight synthetic stucco composition is disclosed which includes a mixture comprising a latex emulsion, water and titanium dioxide as well as a number of additives for adjusting the properties of the mixture and further including an admixture of hollow microspheres and macrospheres, with the microspheres having a diameter of about 10 to 150 microns and the macrospheres having a diameter of from 300 to 2000 microns, the admixture comprising between 30 and 60% of the finished composition. Utilizing a mixture of microspheres and macrospheres produces a substantial weight savings which makes the synthetic stucco composition easier to apply, less costly to transport and less demanding on the structure of the building. In addition, the particular combination of spherical structures provides a uniform tightly knit appearance free of pinholes and craters as the smaller particles fill the void spaces between the larger ones with the spherical shape of the particles allowing them to pack in a very tight arrangement. Where it is desired to have a more textured appearance, between 1 to 25% by weight coarse silica sand may be added to the admixture, with the coarse silica sand having a particle size from 1500 to 2000 microns.

6 Claims, 1 Drawing Sheet

TEXTURED EXTERIOR SURFACE TREATMENT

TECHNICAL FIELD

This invention relates to surface coating compositions and more particularly to lightweight trowelable synthetic stucco surface coatings.

BACKGROUND OF THE INVENTION

Synthetic wall coatings for new construction and renovation generally utilize the application of a synthetic coating to the exterior of a building which is easily applied and manipulated to produce an attractive outer surface. A synthetic stucco composition which is trowel applied is particularly preferred to produce a decorative wall coating of a desired texture. Such a synthetic stucco material is generally used in energy saving composite wall systems or may be used as a finish over existing masonry walls. Such stucco-type compositions usually include a latex binder combined with various fillers and additives such as pigments. Such stucco coatings may be used to insulate and waterproof, as well as to decorate, the exterior of buildings.

Generally, silica sand is used as the filler, comprising up to 60% of the stucco composition. Such silica usually includes a trace amount of tramp iron which, over time, bleeds through the applied coating, causing streaks or discoloration. In addition, silica sand is heavy, adding substantial weight to the compositions, increasing transportation costs and adding to the fatigue of workers who must add and work the composition on a wall with a trowel. The silica sand is also of non uniform size and shape, producing a non-uniform surface texture easily susceptible to cracking. A cratered surface is common, even after manipulation with a trowel.

In U.S. Pat. No. 4,391,647 to Deer et al, a spackling joint compound is disclosed for use as a stucco composition. The compound includes a proportion of hollow silica particles which have an average diameter of from about 25 microns to about 100 microns, and a density of from about 0.1 gm per cc to about 0.2 gm per cc. About one to five parts by weight of hollow-silica particles are added to a base composition. The use of hollow-silica particles is said to produce a lighter weight composition and provide less trowel drag during application, with improved surface leveling characteristics.

In U.S. Pat. No. 4,171,228 to Lowrey, a pigment composition for a high build protective coating is disclosed which includes pigments selected from a first group consisting of low density pigments of smooth nodular shape having a maximum particle size of 325 microns and a second group consisting of pigments having a median particle diameter ranging from 0.5 to 20 microns and being shaped so that not more than 20% by weight of the smaller particles have ratios of any two dimensions exceeding 10. The total pigment volume concentration is not less than 40% and the total volume of both groups of pigments is not less than 75% of the total volume of pigments in the coating material. A blend of both groups contains from 20 to 95% by volume of the first group of pigments and from 5 to 80% by volume of the second group of pigments.

In U.S. Pat. No. 4,356,037 to Novak, an abrasion resistant coating is disclosed which includes a binder having dispersed therein first abrasion resistant particles of substantially uniform size and second abrasion resistant particles of substantially uniform size, the second particles having a diameter of less than 15.4% of the first particles. The use of two different sizes of abrasion resistant particles enhances the overall resistance of the coating to erosion by contact with various particle sized abrasives.

Although various types of fillers are disclosed for inclusion in base compositions for synthetic stucco, the final compositions are typically of substantial weight and do not achieve optimum application characteristics, particularly where trowel application of a decorative coating is required. Consequently, the search continues for synthetic stucco-type compositions which include fillers which reduce weight while increasing the ease of application.

SUMMARY OF THE INVENTION

It is an object of the present invention to provide a stucco-type composition which is easily trowelable onto a surface.

It is another object of the present invention to provide a synthetic stucco composition which is very lightweight and easily transportable.

It is another object of the present invention to provide a synthetic stucco composition which produces an essentially uniform surface texture, eliminating voids or cracks.

It is yet another object of the present invention to provide a composition which essentially avoids the use of silicon particles as a filler, thereby providing an essentially iron free composition which is not susceptible to rust or bleed through.

According to the present invention, a synthetic stucco type composition which is trowelable onto a surface is disclosed which comprises a latex-based formulation which may include various additives for adjusting the properties of the composition such as bactericides, fungicides, thickening agents, etc. The composition further includes an admixture of microspheres, having a diameter of from about 10 to 150 microns and macrospheres, having a diameter of 300 to 2,000 microns, dispersed therein. The macrospheres are admixed in a ratio of about 1:1 to about 4:1 relative to the microspheres, by weight, with the admixture comprising from 10-50% by weight of the final composition.

Utilizing an admixture of microspheres and macrospheres in a synthetic stucco composition provides enhanced trowelability while reducing substantially the weight of the composition. In addition, the distribution of particle sizes contributes to a uniform texture of the synthetic stucco finish with the smaller particles filling the void space between the larger ones, giving the surface texture a tightly knit appearance free of pinholes and craters. Since the particles are more perfectly spherical than silica sand, the particles pack into a very tight arrangement. Another advantage of such an admixture is that the larger size particles control the spread rate and coverage of the synthetic stucco, allowing a trowel to float over the surface of the material during application, while the small particles are packed. This is achieved quickly and easily by first spreading the composition then lightly rubbing the trowel over the surface in a circular pattern, thereby moving only a portion of the largest particles while packing the smaller particles to provide a uniform surface texture. Consequently, the time required to apply a decorative coating is reduced, while the appearance is enhanced.

DETAILED DESCRIPTION OF THE INVENTION

Figure 1:
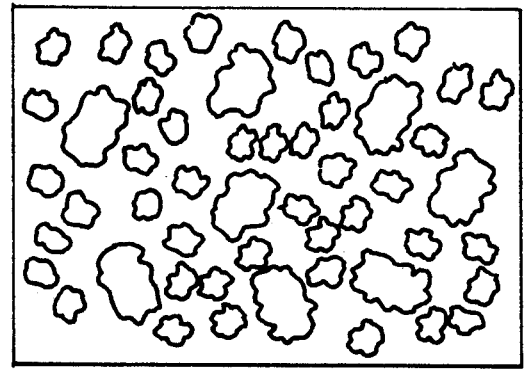
Fig. 1 shows a representative microscopic view of a composition of the prior art.

The composition of the present invention includes a base composition which may comprise a mixture of acrylic latex emulsion, water, titanium dioxide, various defoamers, bactericides, and/or mildewicide/fungicides as well as thickeners such as hydroxyethylcellulose. The base composition may also include a solvent for the thickener such as ethylene glycol. Generally, the ingredients of the base composition are well known in the art for producing synthetic stucco compositions. While a particular combination of components will be discussed, it will be understood by those skilled in the art that various combinations of materials, ingredients, and additives can be used to produce a base composition.

For producing a trowelable stucco material, a key property is the viscosity which is required to provide ease of application and formation of the decorative shapes. Generally, viscosities on the order of 70,000 cps are common, with such viscosities generally achieved through the controlled addition of the thickening agent.

The inventive composition also includes an admixture of microsphere and macrosphere fillers in a ratio of 1:1 to 4:1 by weight respectively. The microspheres have a diameter of from 10 to 150 microns and the macrospheres have a diameter of from 300 to 2000 microns. Generally, the smaller size microspheres are preferably composed of glass with the macrospheres preferably composed of a ceramic, such as silicon carbide or alumina. Generally, about 10 to 50% by weight of the final stucco composition is the microsphere/macrosphere admixture, with 30 to 50% preferred. The mean diameter ratio of the microspheres to the macrospheres is also important to achieving proper packing. Generally, the microsphere should be from 16 to 35% of the diameter of the macrospheres to produce an optimum coating texture.

The microsphere preferably have a specific gravity of about 0.5-0.7 with the macrospheres having a specific gravity of about 0.5 to 1.5. Such low densities are achieved by utilizing hollow micro spheres such as the hollow glass spheres disclosed in U.S Pat. No. 4,171,228 to Lowrey, and are available from P.A. Industries and/or by using as macrospheres the ceramic spheres including a microporous interior structure such as that disclosed in U.S. Pat. No. 4,632,876 to Laird et al., or those disclosed in U.S. Pat. No. 4,680,230 to Gibb et al., which are available from 3M. Since these spheres are of such low density and comprise such a large percentage of the final stucco composition, there is a substantial savings in weight over typical synthetic stucco compositions. Generally, conventional stucco contains a large percentage of silica sand or other fillers which produce a product with a weight of about 14 to 15 pounds per gallon. Utilizing the microspheres and macrospheres in an admixture according to the invention produces a product with a weight of about 8 to 9 pounds per gallon. This is approximately a 35 to 47% reduction in weight, which makes the inventive composition easier to use, less costly to transport, and less demanding on the structure of the building.

Where silica is used as a filler, an additional problem is bleed through of residual iron which may discolor the stucco after application. While low iron silica is available, trace amounts of iron still persist, with the traces multiplied by the large quantity of silica used. Eliminating silica sand from the composition eliminates this problem of rust or bleed through.

Another advantage of the present invention is that the distribution of particles sizes contributes to a reduction in void spaces which could otherwise produce pinholes or craters in the synthetic stucco finish. Generally, since the particles are all spherically shaped rather than an odd mixture of shapes, the particles tend to pack closely into a very tight arrangement which provides an exceptionally smooth surface.

Utilizing the larger particle size of the macrosphere also effectively increases the spreadability of the composition, allowing thinner coatings to be applied, further reducing the weight of the final coating. The larger particle sizes tend to float with a trowel over the surface of the material making it easier to apply while at the same time providing ease in spreading and shaping the coating into a decorative configuration.

In another embodiment of the present invention, the composition, including the admixture of microspheres and macrospheres, further comprises the inclusion of a percentage of coarse silica sand, from about 1 to 25% by weight. Rather than being added as a filler, which requires substantially more silica sand, this silica sand is added to provide a different texture than the material without the silica sand. Generally, the coarse silica sand has a particle size of about 1500 to 2000 microns, producing a grainy appearance. Utilizing such a smaller percentage of silica substantially reduces the potential for bleed through from trace iron.

A typical formulation including the microsphere and macrosphere admixture is disclosed in Table 1. A typical formulation including the admixture as well as the coarse silica sand is disclosed in Table 2.

TABLE 1

| Ingredient* | Wt. |
| --- | --- |
| Acrylic Emulsion | 34.8 |
| Water | 5.8 |
| Titanium Dioxide | 11.6 |
| Defoamer | 0.25 |
| Bacteriacide | 0.20 |
| Mildewcide/Fungicide | 0.20 |
| Microspheres | 11.6 |
| Macrospheres | 34.31 |
| Hydroxyethyl Cellulose | 0.32 |
| Ethylene Glycol | 0.92 |

TABLE 2

| Ingredient* | Wt. |
| --- | --- |
| Acrylic Emulsion | 29.53 |
| Water | 4.8 |
| Titanium Dioxide | 9.6 |
| Defoamer | 0.25 |
| Bacteriacide | 0.20 |
| Mildewcide/Fungicide | 0.20 |
| Microspheres | 9.6 |
| Macrospheres | 19.8 |
| Silica Sand | 25.73 |
| Hydroxyethyl Cellulose | 0.26 |
| Ethylene Glycol | 0.76 |

*Universal water-based tints are added to the system to shade the product to the desired color. The range of tint added is between [0-4] fluid ounces/gal.

The inventive composition is manufactured using conventional paint dispersing equipment such as a Hockmeyer disperser or other similar equipment which is able to grind the titanium dioxide to a hegman grind of 6.. Generally, high-speed dispersion is only necessary to adequately disperse the titanium dioxide within the base composition to whiten the product.

To produce the composition of Table 1, an acrylic latex emulsion, such as Rhoplex-AC-234, manufactured by Rohm & Haas, is first charged to a mixing tank which may be made of mild steel or stainless steel. The other ingredients such as water, defoamer, bactericide, fungicide/mildewicide and titanium dioxide, are then added and dispersed at high speed for about 15 to 30 minutes. A grind check is then made and once it shown that at least a grind of six is achieved, the disperser is set at low speed and the admixture of microspheres and macrospheres is added slowly to the base composition. The admixture includes microspheres obtained from P.A. Industries (Extendospheres SL-50), and macrospheres obtained from 3M Company, Industrial Mineral Products Division (Macrolite ceramic spheres ML-3050 and ML-814). Slow addition of the admixture is required to prevent any overshearing which could possibly break or fracture the frangible hollow spheres. At this point, various pigments or coloring agents may be added to tint the batch to a desired shade. After mixing for a period of time, for example about 10-15 minutes, a thickener such as hydroxyethylcellulose (pre-mixed with a solvent such as ethylene glycol) is added to the mixture. For example, 3 lbs of Natiolsol, made by Aqualon, Inc , is added to 10 lbs of ethylene glycol, and mixed to uniform consistency, prior to addition to the stucco composition. The thickener is added last to allow the even distribution of the various components while the mixture is at a low viscosity, on the order of about 10 to 15 kcps, which allows the batch to achieve a uniform texture and color in a minimum amount of time. Enough thickener is added to achieve a viscosity of about 70 kcps, which is required to produce a trowelable mixture, with the viscosity checked by adjusting the temperature to 77°0 F. and using a Brookfield viscometer. Where it is desired to have a coarse surface finish, a quantity of silica sand is added along with the microsphere and macrospheres admixture to ensure uniform distribution through the batch. About 1-25% by weight of low iron silica sand having a particle size of 1500-2000 microns may be added to adjust the surface texture. This is a substantial reduction from the 40-60% silica sand required in most synthetic stucco formulations, substantially reducing the potential for bleed through.

Figure 2:
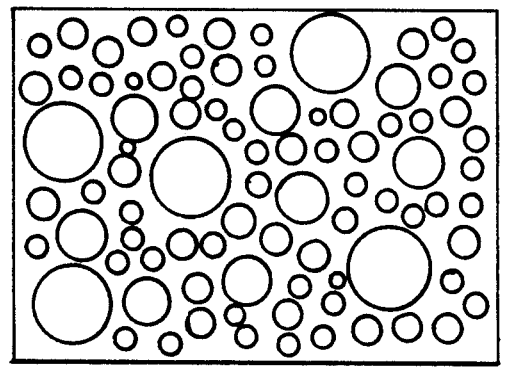
FIG. 2 shows a representative microscopic view of a composition of the invention.

FIG. 1 shows a microscopic view of a prior art composition. The known compositions are irregularly packed, with large gaps between components. This can cause surface pinholes and a non-uniform surface texture and profile. In contrast, FIG. 2 shows a microscopic view of a composition of the invention. The spherical particles permit closer packing, which provides a smoother surface that is free of pinholes and crates.

While this invention is discussed in relation to a trowelable stucco composition including a plurality of additives included therein, it will be understood by those skilled in the art that any changes in the choice or quantity of additives or base composition can be made without varying from the scope of the present invention.

I claim:

1. A trowelable, synthetic, and textured stucco composition suitable for thin-layer applications, and having a viscosity of about 70 kcps,
   the base composition thereof including a latex emulsion with additives dispersed therein, and
   the stucco composition further comprising:
   an admixture of microspheres, having a diameter of about 10 to 150 microns, and macrospheres, having a diameter of about 300 to 2000 microns, the microsphere to macrosphere ratio being from about 1:1 to 1:4 by weight, the admixture comprising from 30 to 60% by weight of the trowelable stucco composition.

2. The synthetic stucco composition of claim 1, wherein the microsphere are hollow-glass spheres and the macrospheres are low density ceramic spheres.

3. The synthetic stucco composition of claim 1, wherein the admixture further comprises coarse silica sand, having a particle diameter of from 1500 to 2000 microns, the silica sand added in an amount of from about 1 to 25% by weight of the trowelable stucco composition.

4. The synthetic stucco composition of claim 1 wherein the base composition includes a latex emulsion, water, and titanium dioxide.

5. The synthetic stucco composition of claim 1 wherein the base composition includes a defoamer, a bactericide, and a mildewicide/fungicide.

6. The synthetic stucco composition of claim 1 further including a pigment dispersed therein.

* * * * *